United States Patent
Im et al.

(10) Patent No.: US 11,494,885 B2
(45) Date of Patent: Nov. 8, 2022

(54) METHOD FOR SYNTHESIZING IMAGE ON REFLECTIVE OBJECT ON BASIS OF ATTRIBUTE OF REFLECTIVE OBJECT INCLUDED IN DIFFERENT IMAGE, AND ELECTRONIC DEVICE

(71) Applicant: Samsung Electronics Co., Ltd., Gyeonggi-do (KR)

(72) Inventors: Nari Im, Gyeonggi-do (KR); Ildo Kim, Gyeonggi-do (KR); Jaegon Kim, Gyeonggi-do (KR); Sangjin Lee, Gyeonggi-do (KR); Yongju Lee, Gyeonggi-do (KR); Changgwun Lee, Gyeonggi-do (KR); Seunghye Chyung, Gyeonggi-do (KR); Hyeyun Jung, Gyeonggi-do (KR); Jiyoon Park, Gyeonggi-do (KR); Jonghoon Won, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/040,308

(22) PCT Filed: Mar. 28, 2019

(86) PCT No.: PCT/KR2019/003678
§ 371 (c)(1),
(2) Date: Sep. 22, 2020

(87) PCT Pub. No.: WO2019/190250
PCT Pub. Date: Oct. 3, 2019

(65) Prior Publication Data
US 2021/0019869 A1   Jan. 21, 2021

(30) Foreign Application Priority Data
Mar. 29, 2018 (KR) .......................... 10-2018-0036657

(51) Int. Cl.
*H04N 5/228* (2006.01)
*G06T 5/50* (2006.01)
(Continued)

(52) U.S. Cl.
CPC .................. *G06T 5/50* (2013.01); *G06T 7/33* (2017.01); *G06V 10/60* (2022.01); *H04N 5/265* (2013.01); *G06T 2207/20221* (2013.01)

(58) Field of Classification Search
CPC .. H04N 5/265; G06T 5/50; G06T 7/11; G06T 7/33; G06T 2207/20221; G06V 10/60; G06V 10/25
See application file for complete search history.

(56) References Cited

U.S. PATENT DOCUMENTS

2006/0222260 A1* 10/2006 Sambongi ............... G06T 5/006
382/274
2014/0139639 A1   5/2014 Wagner et al.
(Continued)

FOREIGN PATENT DOCUMENTS

JP   2012070103   4/2012
JP   2016001914   1/2016
(Continued)

OTHER PUBLICATIONS

PCT/ISA/210 Search Report issued on PCT/KR2019/003678, dated Jul. 3, 2019, pp. 5.
(Continued)

*Primary Examiner* — Kelly L Jerabek
(74) *Attorney, Agent, or Firm* — The Farrell Law Firm, P.C.

(57) ABSTRACT

An electronic device comprises a first camera capable of photographing a designated direction, a second camera capable of photographing a direction different from the designated direction, a memory, and a processor, wherein
(Continued)

the processor can be configured to acquire first images by using the first camera and second images by using the second camera, confirm at least one reflective object having a reflective attribute related to the light reflection in the first images, and synthesize, on the basis of the reflective attribute, at least a part of the second images with at least a part of an area corresponding to the at least one reflective object.

15 Claims, 14 Drawing Sheets

(51) Int. Cl.
  *G06T 7/33* (2017.01)
  *H04N 5/265* (2006.01)
  *G06V 10/60* (2022.01)

(56) References Cited

U.S. PATENT DOCUMENTS

| | | | |
|---|---|---|---|
| 2014/0267631 | A1 | 9/2014 | Powers et al. |
| 2014/0354848 | A1 | 12/2014 | Kim et al. |
| 2015/0062381 | A1 | 3/2015 | Na et al. |
| 2015/0067554 | A1 | 3/2015 | Lee et al. |
| 2016/0300327 | A1* | 10/2016 | Kriener ............... G06T 11/60 |
| 2018/0139345 | A1* | 5/2018 | Goh .................. H04N 1/19594 |
| 2019/0102872 | A1* | 4/2019 | Moussa .................. G06T 5/50 |

FOREIGN PATENT DOCUMENTS

| | | |
|---|---|---|
| JP | 2016086200 | 5/2016 |
| KR | 20010107004 | 12/2001 |
| KR | 1020140086309 | 7/2014 |
| KR | 1020140142538 | 12/2014 |
| KR | 1020150026396 | 3/2015 |
| KR | 1020150026561 | 3/2015 |
| KR | 1020150111999 | 10/2015 |

OTHER PUBLICATIONS

PCT/ISA/237 Written Opinion issued on PCT/KR2019/003678, dated Jul. 3, 2019, pp. 4.
Korean Office Action dated Jul. 25, 2022 issued in counterpart application No. 10-2018-0036657, 5 pages.

* cited by examiner

<1001>

<1101>

METHOD FOR SYNTHESIZING IMAGE ON REFLECTIVE OBJECT ON BASIS OF ATTRIBUTE OF REFLECTIVE OBJECT INCLUDED IN DIFFERENT IMAGE, AND ELECTRONIC DEVICE

PRIORITY

This application is a National Phase Entry of PCT International Application No. PCT/KR2019/003678 which was filed on Mar. 28, 2019, and claims priority to Korean Patent Application No. 10-2018-0036657, which was filed on Mar. 29, 2018, the content of each of which is incorporated herein by reference.

TECHNICAL FIELD

Various embodiments of the disclosure relate to an image synthesizing method and an electronic device for implementing the method.

BACKGROUND ART

Each of various electronic devices, for example, a smart phone, a tablet PC, a portable multimedia player (PMP), a personal digital assistant (PDA), a laptop personal computer (laptop PC), and wearable devices such as a wrist watch and a head-mounted display, may include a camera and may capture an image by using the camera.

A user may upload an image captured using the camera of each of the electronic devices to an external electronic device.

DISCLOSURE OF INVENTION

Technical Problem

Various embodiments of the disclosure relate to an image synthesizing method and an electronic device for implementing the method, wherein images may be synthesized using a cloud service.

Solution to Problem

An electronic device according to various embodiments of the disclosure may include: a first camera configured to capture an image in a designated direction; a second camera configured to capture an image in a direction different from the designated direction; a memory; and a processor, wherein the processor is configured to: acquire a first image by using the first camera and a second image by using the second camera; identify at least one reflective object having a reflective attribute related to light reflection in the first image; and synthesize, based on the reflective attribute, at least a part of the second image with at least a part of a region corresponding to the at least one reflective object.

An electronic device according to various embodiments of the disclosure may include: a camera; a memory; and a processor, wherein the processor is configured to: acquire a first image in a designated direction by using the camera; identify at least one reflective object, having a reflectance greater than a designated reflectance with respect to light, in the first image; and synthesize, based on a reflective attribute, at least a part of a second image, captured in a direction different from the designated direction, with at least a part of a region corresponding to the at least one reflective object.

According to various embodiments of the disclosure, an image synthesizing method of an electronic device, which includes: a first camera configured to capture an image in a designated direction; a second camera configured to capture an image in a direction different from the designated direction, may include: acquiring a first image by using the first camera and a second image by using the second camera; identifying at least one reflective object having a reflective attribute related to light reflection in the first image; and synthesizing, based on the reflective attribute, at least a part of the second image with at least a part of a region corresponding to the at least one reflective object.

According to various embodiments of the disclosure, an image capturing method of an electronic device including a camera may include: acquiring a first image in a designated direction by using the camera; identifying at least one reflective object, having a reflectance greater than a designated reflectance with respect to light, in the first image; and synthesizing, based on a reflective attribute, at least a part of a second image, captured in a direction different from the designated direction, with at least a part of a region corresponding to the at least one reflective object.

Advantageous Effects of Invention

An image synthesizing method and an electronic device for implementing the method according to various embodiments of the disclosure can synthesize images by using a cloud service so as to provide various images to a user.

MODE FOR THE INVENTION

Figure 1:
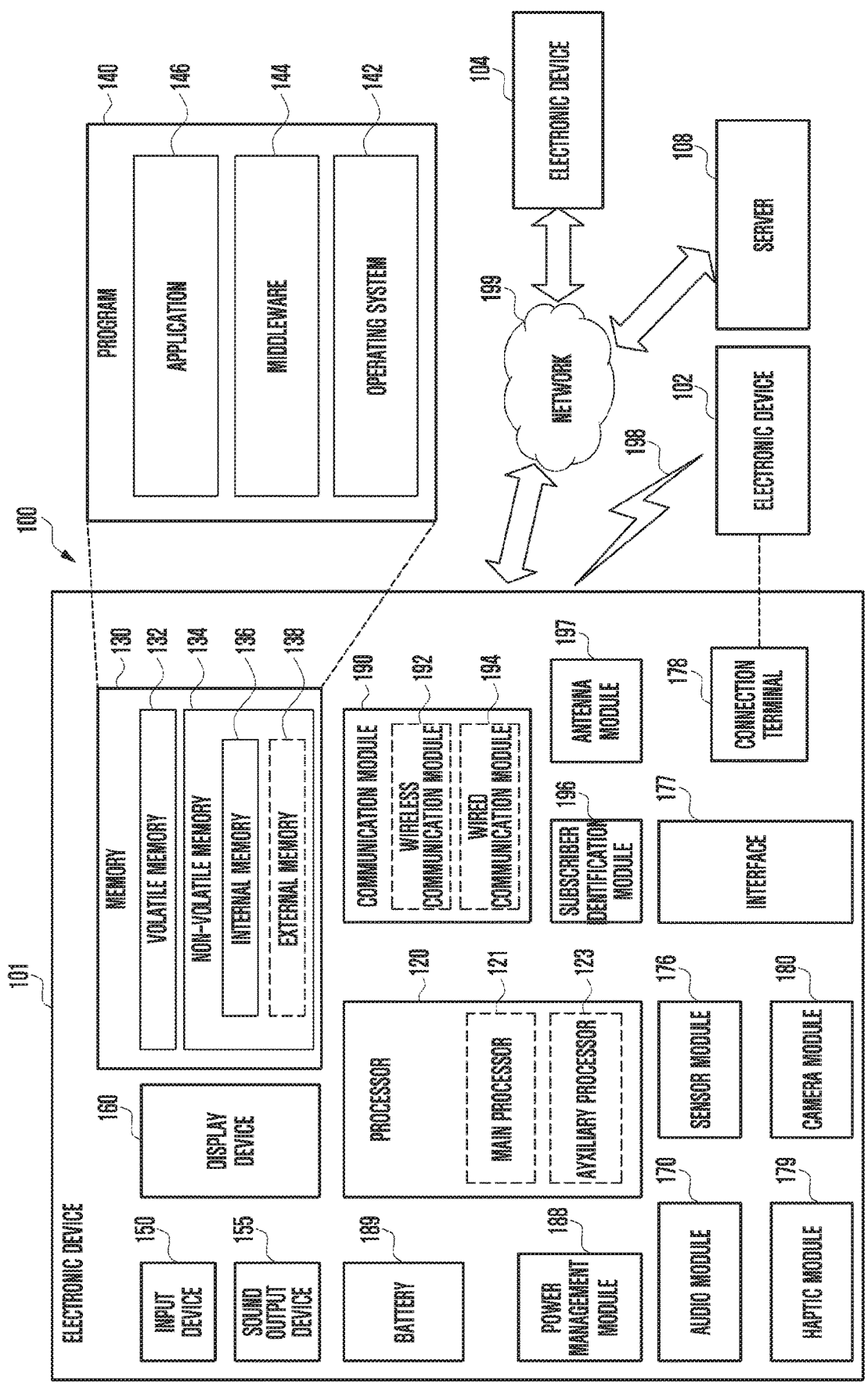
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The electronic device 101 may include at least one camera module 180, and may include a front camera and a rear camera located on the opposite side.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described elements may be connected to each other via a communication method between peripheral devices (e.g. bus, general purpose input and output (GPIO), serial peripheral interface (SPI), or mobile industry processor interface (MIPI)) and may exchange a signal (e.g. commands or data) therebetween.

According to one embodiment, a command or data may be transmitted or received between the electronic device 101 and the external electronic device 104 via the server 108 connected to the second network 199. The type of each of the electronic devices 102 and 104 may be identical to or different from that of the electronic device 101. According to one embodiment, all or some of operations performed by the electronic device 101 may be performed by at least one of the external electronic devices 102, 104, or 108. For example, when the electronic device 101 is required to perform a function or a service automatically or in response to a request from a user or another device, the electronic device 101 may request one or more external electronic devices to perform at least a part of the function or the service, instead of or in addition to directly performing the function or the service. The one or more external electronic devices, which have received the request, may execute the requested at least a part of the function or service or an additional function or service related to the request, and may transfer a result of the execution to the electronic device 101. The electronic device 101 may process the result as it is or additionally, and may provide the processed result as a part of a response to the request. To this end, for example, cloud computing, distributed computing, or client-server computing technology may be used.

Figure 2:
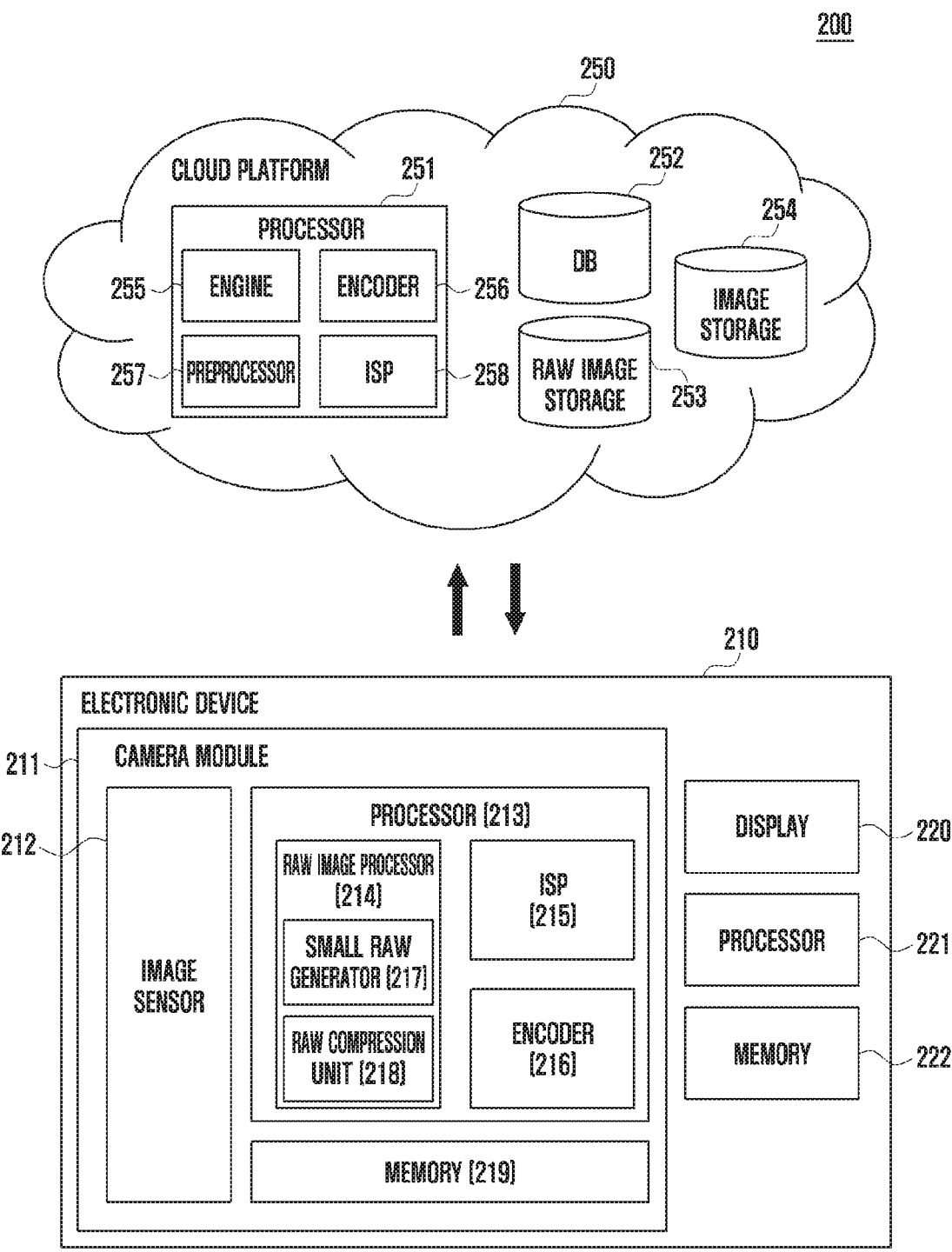
FIG. 2 is a block diagram of an electronic device and a cloud platform according to various embodiments.

FIG. 2 is a block diagram 200 of an electronic device 210 and a cloud platform 250 according to various embodiments. Referring to FIG. 2, the electronic device 210 may include a camera module 211, a display 220, a processor 221, and memories 219 and 222. The electronic device 210 in FIG. 2 may be, for example, the electronic device 101 of FIG. 1. The camera module 211 of FIG. 2 may be, for example, the camera module 180 of FIG. 1. The display 220 of FIG. 2 may be, for example, the display device 160 of FIG. 1. A processor 213 or the processor 221 of FIG. 2 may be, for example, the processor 120 of FIG. 1. The memories 219 and 222 of FIG. 2 may be, for example, the memory 130 of FIG. 1.

The camera module 211 may include an image sensor 212, the processor 213, and the memory 219. The processor 213 may include a raw image processor 214, an image signal processor (ISP) 215, and an encoder 216.

The image sensor 212 may acquire various raw images of a subject. The image sensor 212 may acquire various types of raw images according to color filter array (CFA) patterns. The image sensor 212, which includes different types of phase difference (or time difference) information in one pixel, may be acquired by using a dual pixel (DP or 2PD) structure of the image sensor 212. At least one image sensor 212 regarding one scene may be acquired by using multiple image sensors having the same or different characteristics (e.g. a dual sensor (e.g. RGB+RGB, RGB+Mono, or Wide+Tele), or an array sensor (e.g. in which two or more sensors are attached)). The acquired image sensor 212 may be stored in the memory 222 as it is or after being additionally processed.

The image sensor 212 may convert light transferred from a subject through a lens assembly (not shown) into an electrical signal so as to acquire an image corresponding to the subject. According to one embodiment, the image sensor 212 may include, for example, one image sensor selected from among image sensors having different attributes, such as an RGB sensor, a black and white (BW) sensor, an IR sensor, or a UV sensor; multiple image sensors having the same attribute; or multiple image sensors having different attributes. Each of the image sensors included in the image sensor 212 may be implemented as, for example, a charged coupled device (CCD) sensor or a complementary metal oxide semiconductor (CMOS) sensor.

The camera module 211 may further include a lens assembly (not shown), a flash (not shown), or an image stabilizer (not shown).

The lens assembly (not shown) may collect light emitted from a subject of which an image is captured. The lens assembly (not shown) may include one or more lenses. According to one embodiment, the camera module 211 may include multiple lens assemblies (not shown). In this case, the camera module 211 may be, for example, a dual camera, a 360-degree camera, or a spherical camera. The multiple lens assemblies (not shown) may have the same lens attributes (e.g. the angle of view, a focal distance, self-focusing, an f-number, or an optical zoom), or at least one lens assembly may have at least one lens attribute different from that of another lens assembly. The lens assembly (not shown) may include, for example, a wide-angle lens or a telephoto lens. The flash (not shown) may emit a light source which is used to reinforce light emitted from a subject. The flash (not shown) may include one or more light-emitting diodes (e.g. a red-green-blue (RGB) LED, a white LED, an infrared LED, or an ultraviolet LED), or a xenon lamp.

In response to movement of the image sensor 212 or the electronic device 210 including the same, the image stabilizer (not shown) may move the image sensor 212 or at least one lens included in the lens assembly (not shown) in a particular direction or may control the image sensor 212 or the at least one lens (e.g. adjust read-out timing), in order to at least partially compensate for a negative effect (e.g. image blur) of the movement on an image to be captured. According to one embodiment, the image stabilizer (not shown) may be implemented as, for example, an optical image stabilizer, and may sense the movement by using a gyro sensor (not shown) or an acceleration sensor (not shown), which is disposed inside or outside the camera module 212.

The raw image may be configured in various formats (e.g. a Bayer format, etc.). The raw image may be expressed by one color among red (R), green (G), and blue (B) with respect to a pixel of the image sensor 212, and can be expressed in a bit-depth of 8 to 16 bits. Various color filter array (CFA) patterns may be applied to a raw image. The raw image may be an image having a layer structure including information of various colors (e.g. multiple colors among R, G, and B) for one pixel. According to various configurations of the image sensor 212, not only color information (e.g. RGB) but also phase difference information may be included. Information regarding image capturing (e.g. time, location, illumination, etc.) may be generated as metadata and may be stored in relation to the raw image.

The processors 213 and 221 of the electronic device may perform various types of processing related to image processing. Various image processing modules (e.g. the raw image processor 214, the ISP 215, the encoder 216) may be included in one processor, and may be distributed to multiple processors 213 and 221. The processor 213 may be provided inside the camera module 211 or outside of the camera module 211 (e.g. in one or multiple servers constituting a part of the electronic device 210 or the cloud platform 250), or may be provided both inside and outside the camera module 211. The various types of processing may be performed by one processor or may be distributed to and performed by multiple processors.

The raw image processor 214 may variously process a raw image acquired by the image sensor 212. With respect to the raw image, the raw image processor 214 may correct lens distortion or may partially remove noise. Since data of the raw image may have a considerably large volume, the raw image processor 214 may reduce a data volume through various types of processing (e.g. downscaling, downsampling, or compression) before storing, processing, or transmitting the raw image.

A small-raw-image generator 217 may generate a small raw image by downscaling (e.g. reducing the size or resolution) or downsampling (e.g. taking one or some samples from among a series of sampled samples) the raw image.

A raw image compression unit 218 may compress the raw image or small raw image by using various image compress algorithms.

The ISP 215 uses recipe information, which includes various types of information on a raw image analyzed by an engine 257, to perform various types of image processing for a raw image. The electronic device 210 may receive the recipe information from the cloud platform 250 and may perform raw image processing based on the recipe information through the ISP 215. For example, the electronic device 210 may complexly perform image processing provided by an embedded ISP of the electronic device 210 and image processing using recipe information. When image processing is performed in the cloud platform 250, raw image processing based on recipe information may be performed through an ISP 258 included in the cloud platform 250. The ISP 258 included in the cloud platform 250 may receive additional information (e.g. a feature vector, etc.) corresponding to the recipe information from a database 252, and may use the additional information to process an image. The processed image may be transmitted to the electronic device 210 or may be stored in an image storage 254 of the cloud platform 250. The image processing may include functions such as white balance, color adjustment, noise reduction, sharpening, and detail enhancement. The above-described functions may be performed for each region of an image, based on the recipe information.

The ISP 215 may perform image processing (e.g. depth map generation, three-dimensional modeling, panorama generation, feature point extraction, image synthesis, or image correction (e.g. noise reduction, resolution adjustment, brightness adjustment, blurring, sharpening, or softening)) with respect to an image acquired through the image sensor 212 or an image stored in the memory 219 or 222. Additionally or alternatively, the ISP 215 may perform control (e.g. exposure time control or read-out timing control) for at least one (e.g. the image sensor 212) of the elements included in the camera module 211. In order to be additionally processed, an image processed by the ISP 215 may be stored again in the memory 250 or may be transmitted to an element (e.g. the memory 130, the display device 160, the electronic device 102, the electronic device 104, or the server 108) outside the camera module 180. According to one embodiment, the ISP 215 may be provided as at least a part of the processor 213 or 221, or may be provided as a separate processor which is operated independently of the processors 213 and 221. When the ISP 215 is formed as a separate processor, the processor 213 or 221 may display images processed by the ISP 215 through the display 220 without or after additional image processing.

The encoder 216 may encode a raw image to generate an image file (e.g. a JPEG, MPEG, or 360-degree image).

The electronic device 210 may include the memory 219 inside the camera module 211 and/or the memory 222 outside the camera module 211. The memory 219 or 222 may store a raw image, a small raw image, an image file, and an image-processed raw image. The memory 219 or 222 may at least temporarily store at least a part of an image acquired through the image sensor 212 for a next image processing operation. For example, when image acquisition according to a shutter is delayed or multiple images are acquired at a high speed, an acquired original image (e.g. a high quality image) may be stored in the memory 219 or 222, and a copy image (e.g. a low quality image) corresponding thereto may be previewed through the display 220. Subsequently, when a designated condition is satisfied (e.g. when there is a user input or a system command), the at least part of the original image, stored in the memory 219 or 222, may be acquired and processed by, for example, the ISP 215. According to one embodiment, the memory 219 may be provided as at least a part of the memory 222, or may be provided as a separate memory which is operated independently of the memory 222.

The electronic device 210 may include a display 222 (e.g. the display device 160 in FIG. 1).

The cloud platform 250 may include, as external devices, a processor 251, a database 252, a raw image storage 253, and an image storage 254. The processor 251 may include an engine (e.g. a recognition engine) 255, an encoder 256, a preprocessor 257, and an ISP 258.

The processor 251 of the cloud platform 250 may perform various processes related to image processing. Various image processing modules (e.g. the engine 255, the encoder 256, the preprocessor 257, and the ISP 258) may be included in one processor, and may be distributed to multiple processors.

The engine 255 analyzes various types of meaningful information (e.g. object recognition, speed vector, face recognition, segmentation, scene parsing, etc.) from an image (e.g. a raw image, a small raw image, an image file, etc.). To this end, the engine 255 may include various algorithms. As a result of the analysis, information usable for various types of image processing (recipe information (e.g. information including segments, layers, vectors, or scene category) by the ISP may be generated, stored, or transmitted in connection with the image.

The encoder 256 may encode a raw image to generate an image file (e.g. a JPEG, MPEG, or 360-degree image).

The preprocessor 257 may perform necessary processing of a raw image received from the electronic device 210 before the raw image is transferred to the engine 255 or the ISP 258. The preprocessor may perform decompression of a compressed image, simple image-quality improvement, demosaic processing, or image format modification.

The ISP 258 uses recipe information, which includes various types of information on the raw image analyzed by the engine 257, to perform various types of image processing for the raw image. The electronic device 210 may receive the recipe information from the cloud platform 250 and may perform raw image processing based on the recipe information through the ISP 215. For example, the electronic device 210 may complexly perform image processing provided by an embedded ISP of the electronic device 210 and image processing using recipe information. When image processing is performed in the cloud platform 250, raw image processing based on recipe information may be performed through the ISP 258 included in the cloud platform 250. The ISP 258 included in the cloud platform 250 may receive additional information (e.g. a feature vector, etc.) corresponding to the recipe information from the database 252, and may use the additional information to process an image. The processed image may be transmitted to the electronic device 210 or may be stored in the image storage 254 of the cloud platform 250. The image processing may include functions such as white balance, color adjustment, noise reduction, sharpening, and detail enhancement. The above-described functions may be performed for each region of an image, based on the recipe information.

The database 252 may store a feature corresponding to the category of an image. The raw image storage 253 may store a raw image. The image storage 254 may store an image file.

Figure 3:
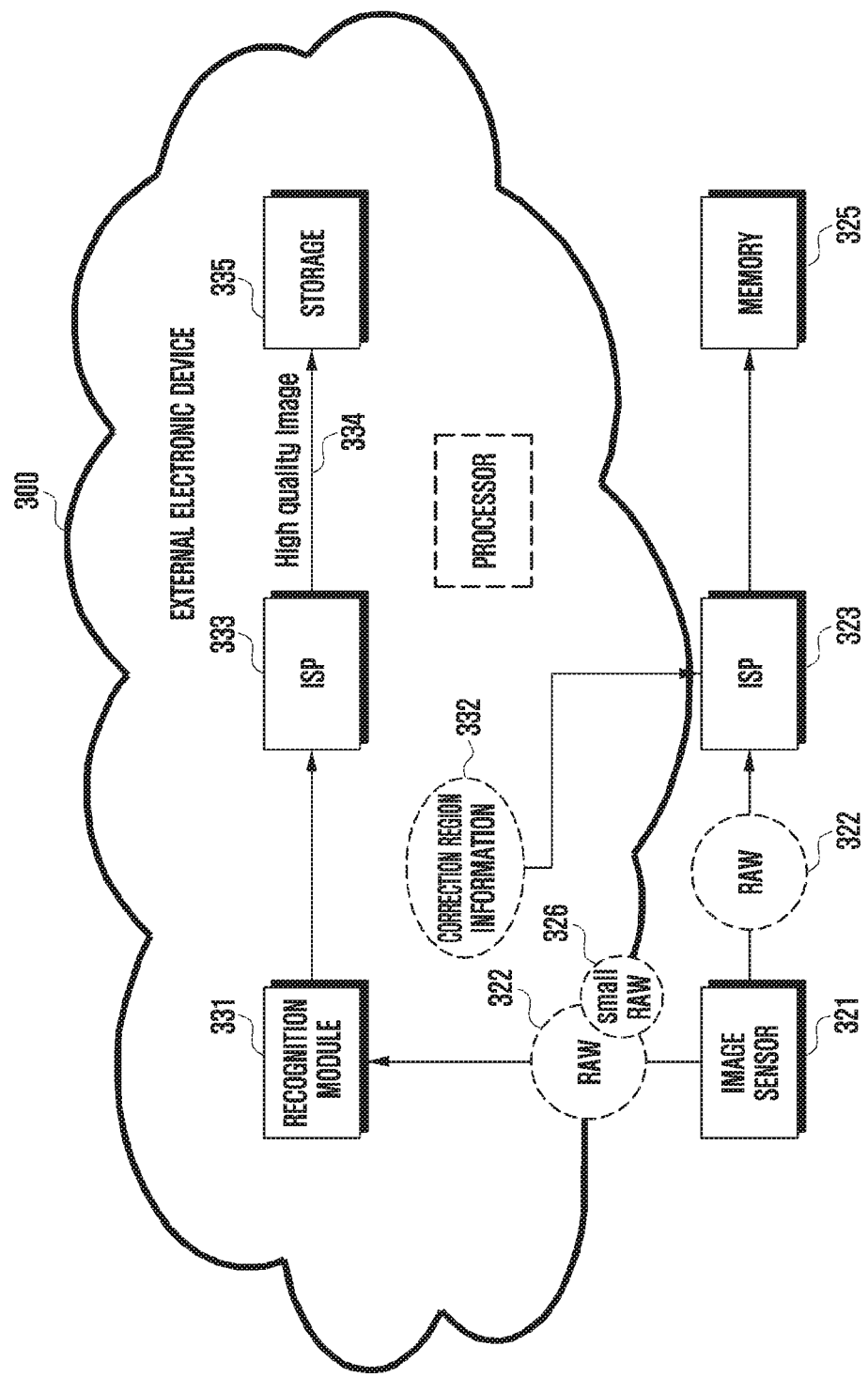
FIG. 3 illustrates a concept for describing operations of an electronic device and an external electronic device according to various embodiments of the disclosure.

FIG. 3 illustrates a concept for describing operations of the electronic device 101 and an external electronic device 300 (e.g. the server 108) according to various embodiments of the disclosure.

The electronic device 101 may include an image sensor 321 (e.g. image sensor 212), an ISP 323 (e.g. ISP 215), and a memory 325 (e.g. memory 222). The external electronic device 300 may include a recognition module 331 (e.g. the engine 255), an ISP 333 (e.g. the ISP 258), and a storage 335 (e.g. the raw image storage 253 or the image storage 254). The recognition module 331 (e.g. the engine 255) may be a logical module, and may be implemented as a processor of the external electronic device 300. The ISP (333) (e.g. the ISP 258) may also be implemented as a processor of the external electronic device 300. For example, the processor of the external electronic device 300 may perform both recognition and image processing. Although not illustrated, the electronic device 101 may include a communication module (e.g. the communication interface 170 or the communication module 220), which can transmit or receive data to or from the external electronic device 300. The external electronic device 300 may include a communication module which can transmit or receive data to or from the electronic device 101.

The image sensor 321 (e.g. the camera module 291) may acquire an image of an external object, and may generate a raw image 322 (raw image) corresponding thereto. The image sensor 321 (e.g. the image sensor 212) may transfer the raw image 322 to the ISP 323 (e.g. the ISP 215). In various embodiments of the disclosure, the image sensor 321 (e.g. the image sensor 212) may generate a small raw image 321 and may transmit the generated small raw image 321 to the external electronic device 300 via a communication module. In another embodiment, a processor of the electronic device 101, which is not the image sensor 321 (e.g. the image sensor 212), may generate the small raw image 321, and may transmit the generated small raw image 321 to the external electronic device 300 via a communication module. The image sensor 321 (e.g. the image sensor 212) may transmit the compressed raw image 322 to the ISP or the external electronic device 300. In order to partially process the raw image 322, the image sensor 321 (e.g. the image sensor 212) may compress the raw image 322 and store the compressed raw image 322 in a memory disposed inside the image sensor 321 (e.g. the image sensor 212). The recognition module 331 (e.g. the engine 255) of the external electronic device 300 may acquire the small raw image 321 via a communication module, and may segment the small raw image 321 into one or more image regions. The recognition module 331 (e.g. the engine 255) may recognize each of the one or more image regions obtained as a result of the segmentation. Correction region information 332, including at least one of information associated with the multiple image regions generated by the recognition module 331, for example, image region coordinate information or a recognition result, may be generated. The correction region information 332 may be transmitted to the electronic device 101. The ISP 323 (e.g. the ISP 215) may correct the raw image 322 by using the correction region information 332, and thus a corrected image 324 may be generated. The corrected image 324 may have, for example, a YUV format. The corrected image 324 may be stored in the memory 325 (e.g. the memory 222). Alternatively, the corrected image 324 may be compressed according to, for example, a JPEG method, and the compressed image may be stored in the memory 325 (e.g. the memory 222). In various embodiments of the disclosure, the raw image 322 provided from the image sensor 321 (e.g. the image sensor 212) may be transmitted to the external electronic device 300 separately from the small raw image 321. Since the raw image 322 has a larger size than the small raw image 321, the small raw image 321 may be first transmitted to the external electronic device 300 and then the raw image 322 may be transmitted to the external electronic device 300. For example, the raw image 322 may be transmitted to the external electronic device 300 while the ISP 323 (e.g. the ISP 215) corrects the raw image 322. The raw image 322 may be uploaded to the external electronic device 300 as it is generated by the image sensor 321 (e.g. the image sensor 212), or a preprocessed image in which lens distortion compensation or noise removal has been performed may be uploaded. The preprocessing described above may be performed in the external electronic device 300. The external electronic device 300 may perform demosaic processing, image format modification, or preprocessing to increase an image recognition rate. The ISP 333 (e.g. the ISP 258) of the external electronic device 300 may correct the received raw image 322. The external electronic device 300 may correct the raw image 322 by using the previously generated correction region information 332, or may correct the raw image 322 by using extended correction region information. The raw image 322 may have a higher resolution than the small raw image 321. Thus, ISP 333 (e.g. the ISP 258) of the external electronic device 300 may acquire more detailed extended correction region information from the high-resolution image. The ISP 333 (e.g. the ISP 258) may generate expanded correction region information by using the previously generated correction region information and the raw image 322 together. The ISP 333 (e.g. the ISP 258) may acquire a high quality image 334 by correcting the raw image 322 by means of the extended correction region information. The high quality image 334 may be stored in the storage 335 of the external electronic device 300, or may be downloaded to the electronic device 101.

The external electronic device 300 may be implemented as, for example, a cloud server, and thus the ISP 333 of the external electronic device may be called a cloud ISP. The ISP 333 of the external electronic device may perform at least one of original color mapping, detail re-generation, text reconstruction, image inpainting, scene-based white balance (WB)/color adjustment, segmentation based noise reduction (NR)/sharpening, or segmentation-based detail enhancement.

Figure 4:
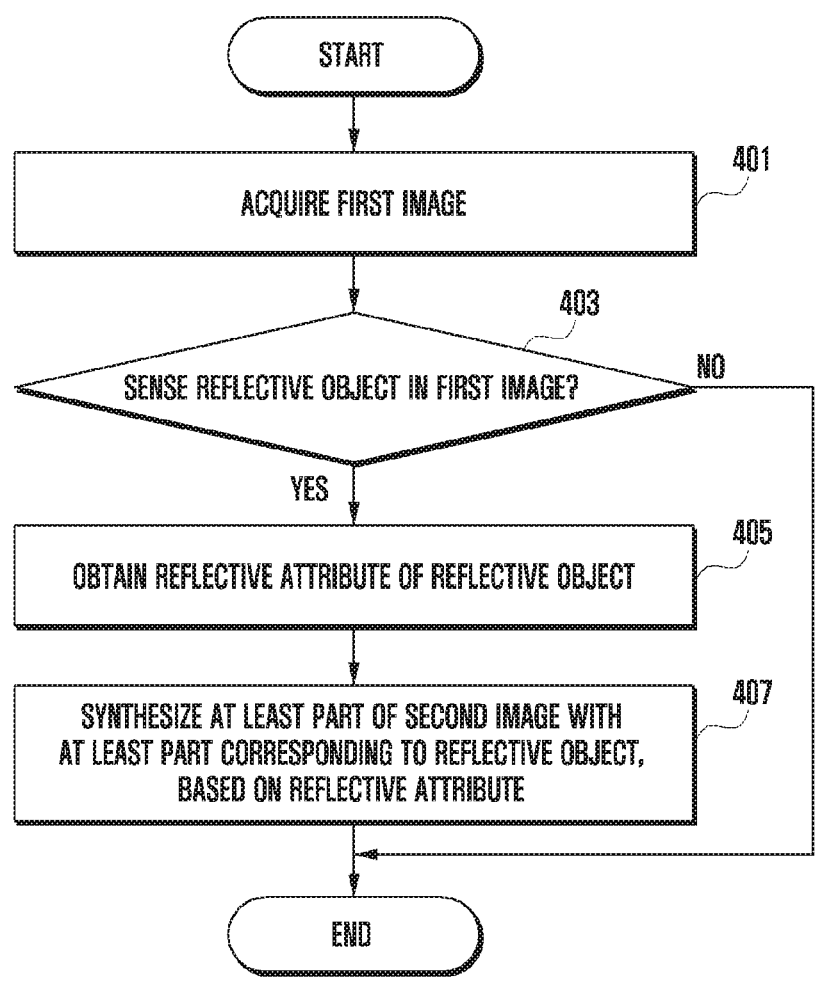
FIG. 4 is a flowchart illustrating an image synthesizing method according to various embodiments of the disclosure.

FIG. 4 is a flowchart illustrating an image synthesizing method according to various embodiments of the disclosure.

According to various embodiments, in operation 401, under control of the processor 213, the electronic device 210 may acquire a first image through the image sensor 212 of the camera module 211.

According to various embodiments, in operation 401, when a user input for image acquisition is received, the electronic device 210 may acquire, under control of the processor 213, the first image through the image sensor 212 of the camera module 211.

According to various embodiments, in operation 403, the electronic device 210 may determine, under control of the processor 213, whether a reflective object is sensed from an object included in the acquired first image. The reflective object is a subject which receives and reflects light, and an image of the reflective object may be captured when the image is acquired through the image sensor 212 of the camera module 211.

Figure 7:
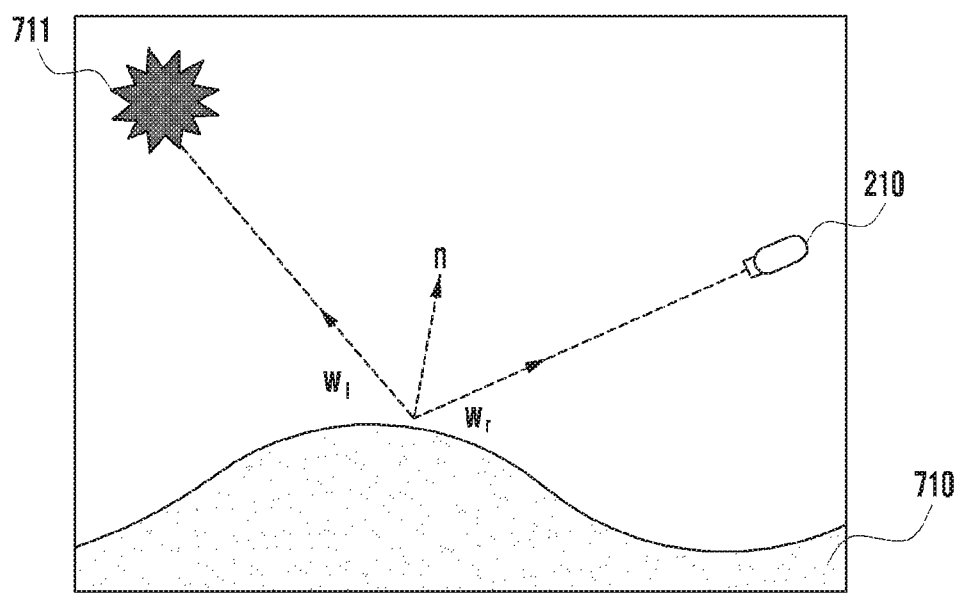
FIG. 7 illustrates a reflective object detection method according to various embodiments of the disclosure.

Referring to FIG. 7, in operation 403, the electronic device 200 may obtain reflectance $f_r(\omega_i,\omega_r)$ with reference to Equation 1 under control of the processor 213. In operation 603, under control of the processor 213, an optical characteristic of the reflective object on the image and the location (e.g. coordinates) of the reflective object on the image may be determined based on the reflectance $f_r(\omega_i,\omega_r)$.

$$f_r(w_r,w_r)=dL_r(w_r)/dE_i(w_i)=dL_r(w_r)/L_i(w_i)\cos\theta_i dw_i \quad \text{[Equation 1]}$$

In various embodiments, in operation 403, the electronic device 200 may be configured to perform an image synthesis operation, under control of the processor 213, when the obtained reflectance $f_r(\omega_i,\omega_r)$ is determined to be greater than a particular (or designated) reflectance.

In various embodiments, in operation 403, the electronic device 200 may be configured to end the image synthesis operation, under control of the processor 213, when the obtained reflectance $f_r(\omega_i,\omega_r)$ is determined to be smaller than the particular (or designated) reflectance. According to various embodiments, under control of the processor 213, the electronic device 210 may transmit the acquired first image to the cloud platform 250 via a communication module (e.g. the communication module 190). The engine 257 of the cloud platform 250 may perform an image recognition operation to generate recognition information regarding the first image, and may transmit the recognition information to the electronic device 210. The recognition information regarding the first image may include information on a reflective attribute of the reflective object. In operation 403, under control of the processor 213, the electronic device 210 may determine whether a reflective object is sensed from an object included in the acquired first image by using the recognition information transmitted from the cloud platform 250.

According to various embodiments, when a reflective object is not sensed from the acquired first image in operation 403, the electronic device 210 may end the image synthesis operation, under control of the processor 213.

According to various embodiments, when a reflective object is sensed from the acquired first image in operation 403, the electronic device 210 may proceed to operation 405, under control of the processor 213. The reflective object may be at least one object having a reflective attribute related to light reflection.

According to various embodiments, in operation 405, the electronic device 210 may obtain, under control of the processor 213, a reflective attribute of the reflective object included in the first image.

The reflective attribute of the reflective object, which is obtained under control of the processor 213 in operation 405, may be at least one of information on a geometric characteristic of the reflective object and information on an optical characteristic of the reflective object.

The information on the geometric characteristic of the reflective object may be at least one of pieces of information regarding, for example, the size of the reflective object in the acquired image, the shape of the reflective object, the curvature of the reflective object, and the location (e.g. coordinates) of a reflective object region in the image.

The information on the optical characteristic of the reflective object may be at least one of pieces of information regarding, for example, the color of the reflective object, the transparency of the reflective object, the refractive index of the reflective object, and the reflectance of the reflective object.

According to various embodiments, in operation 405, under control of the processor 213, the electronic device 210 may obtain, from the recognition information transmitted by the cloud platform 250, reflective attribute information of the reflective object included in the recognition information.

According to various embodiments, a second image is an image pre-stored in the cloud platform 250, and the electronic device 210 may receive the second image from the image storage 254 of the cloud platform 250 via a communication module (e.g. reference numeral 190 in FIG. 1).

According to various embodiments, when the cloud platform 250 receives the first image from the electronic device 210, the engine 257 of the cloud platform 250 may perform an image recognition operation to generate recognition information regarding the first image. Further, the engine 257 of the cloud platform 250 may generate recognition information of the second image. The cloud platform 250 may select the second image which is associated with the first image. The cloud platform 250 may select the second image, which is associated with the first image, by using the recognition information on the first image and on the second image. For example, when a partner or a family member of a main user (e.g. a user) of the electronic device 210 is recognized as an object in the first image, the second image associated with the first image may be an image related to the main user of the electronic device 210. The cloud platform 250 may determine a correlation between the first image and the second image by using recognition information of an object in each of the first image and the second image.

According to various embodiments, the second image may be an image pre-stored in the memory 222 of the electronic device 210.

According to various embodiments, in operation 407, under control of the processor 213, the electronic device 210 may synthesize, based on a reflective attribute, at least a part of the second image with at least a part of the first image, which corresponds to the reflective object.

According to various embodiments, in operation 407, under control of the processor 213, the electronic device 210 may synthesize at least a part of the second image with at least a part of the first image according to the obtained reflective attribute of the reflective object.

According to various embodiments, synthesizing the at least part of the second image with the at least part of the first image according to the obtained reflective attribute of the reflective object may be an operation in which the processor 213 changes at least one of the size, curvature, and shape of the second image by using information on the geometric characteristic of the reflective object and changes at least one of the color, refractive index, and transparency of the second image by using information on the optical characteristic of the reflective object.

For example, the synthesizing operation may be an operation of changing the second image so as to coincide with the shape, the curvature, and size of the reflective object and changing the second image so as to correspond to the color, transparency, and refractive index of the reflective object.

According to various embodiments, in operation 407, when the second image is changed according to the obtained reflective attribute of the reflective object, the electronic device 200 may synthesize, under control of the processor 213, the changed second image with the first image according to information on the location (e.g. coordinates) of a reflective object region on the image such that the changed second image corresponds to a reflective object region of the first image.

According to various embodiments, in operation 407, when the second image is changed according the obtained reflective attribute of the reflective object, the electronic device 200 may synthesize, under control of the processor 213, at least a part of the changed second image with the first image according to information of the location (e.g. coordinates) of a reflective object region on the image such that the at least part of the second image corresponds to a reflective object region of the first image.

According to various embodiments, in operation 407, under control of the processor 213, the electronic device 200 may determine, based on the relative location of at least one reflective object and at least a part of the second image, at least one of a location or a shape in which the at least a part of the second image is to be synthesized with at least a part of a region corresponding to the at least one reflective object.

When FIG. 4 is described with reference to FIG. 10A, the electronic device 200 may identify, under control of the processor 213, a reflective object 1011 included in a first image 1010, and may synthesize at least a part of the second image with the region of the reflective object 1011 according to a reflective attribute of the reflective object to generate a changed image 1012.

Figure 5:
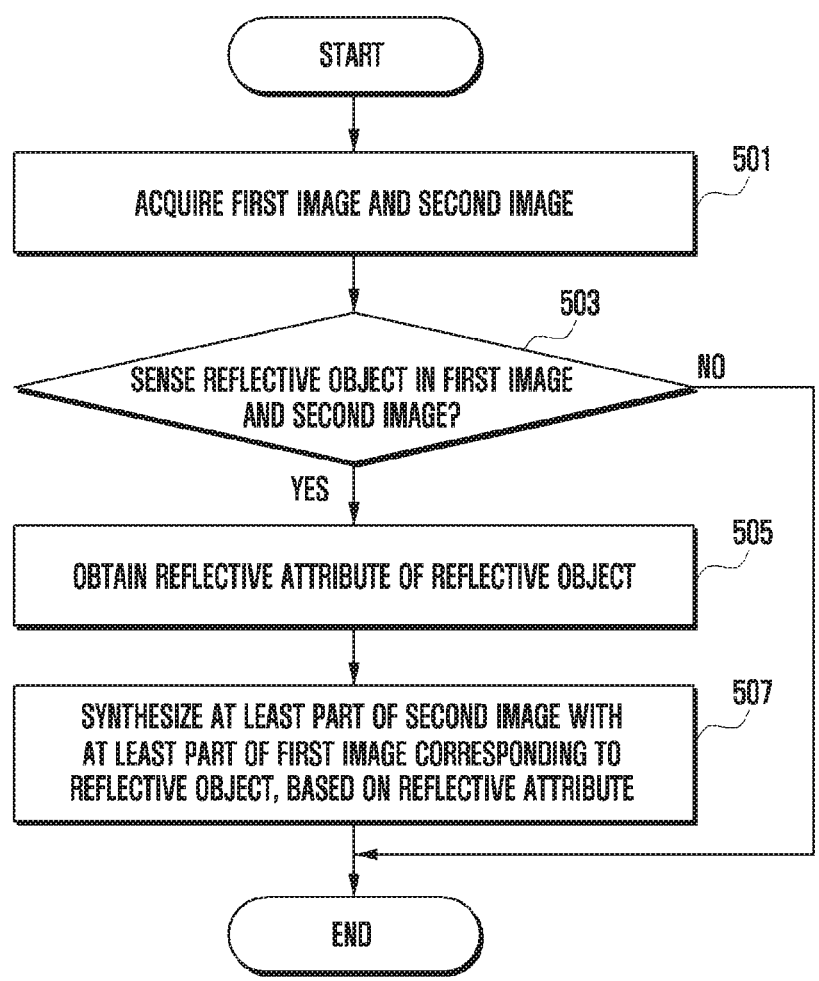
FIG. 5 is a flowchart illustrating an image synthesizing method according to various embodiments of the disclosure.

FIG. 5 is a flowchart illustrating an image synthesizing method according to various embodiments of the disclosure.

According to various embodiments, in operation 501, under control of the processor 213, the electronic device 210 may acquire a first image and a second image through the image sensor 212 of the camera module 211.

According to various embodiments, in operation 501, when a user input for image acquisition is received, the electronic device 210 may acquire, under control of the processor 213, the first image and the second image through the image sensor 212 of the camera module 211.

Figure 12:
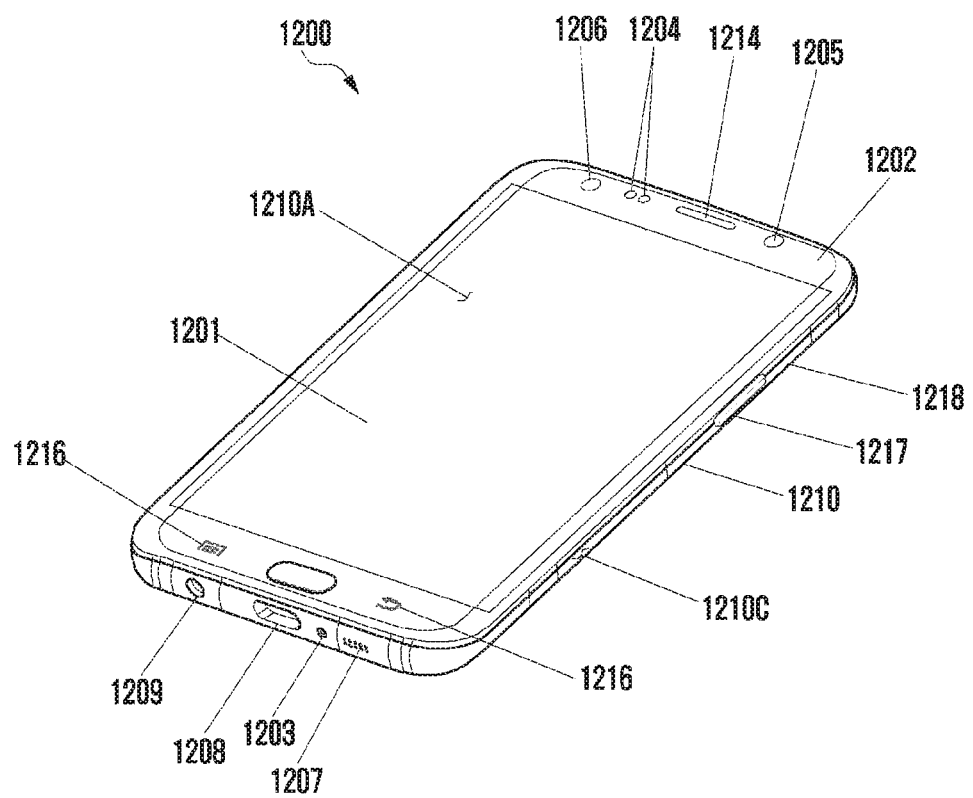
FIG. 12 is a perspective view of the front of a mobile electronic device according to one embodiment.
Figure 13:
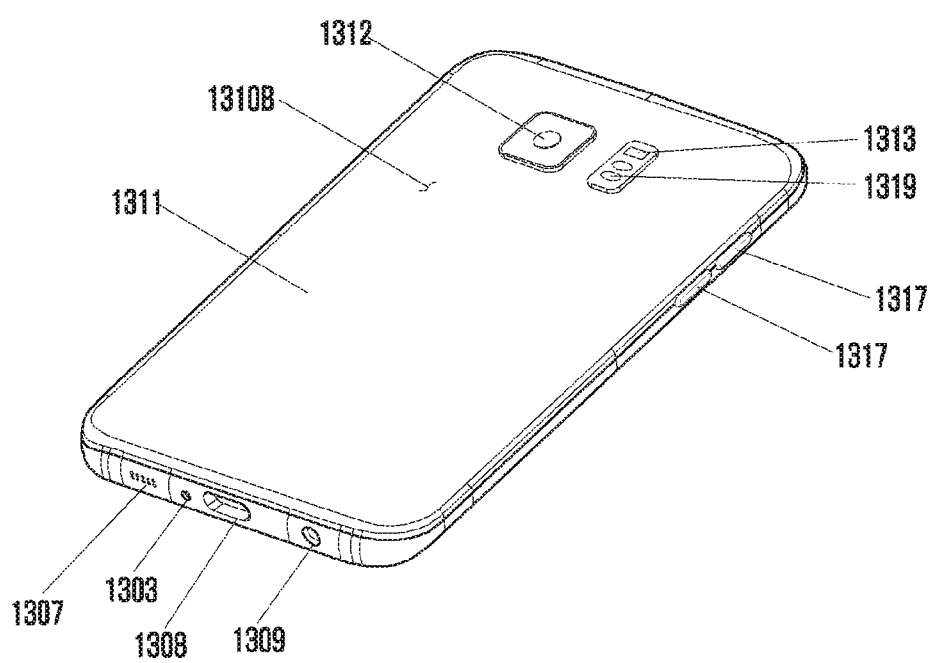
FIG. 13 is a perspective view of the rear of the mobile electronic device of FIG. 12.

Referring to FIGS. 12 and 13, for example, the first image may be an image acquired by a front camera 1205 disposed on a first surface 1210A of an electronic device 1200, and the second image may be an image acquired by a rear camera 1212 or 1213 disposed on a second surface 1210B of the electronic device 1200.

According to various embodiments, the first image may be an image acquired by the rear camera 1212 or 1213 which is disposed on the second surface 1210B of the electronic device 1200, and the second image may be an image acquired by the front camera 1205 which is disposed on the first surface 1210A of the electronic device 1200.

According to various embodiments, the first image may be an image acquired in a first direction of the electronic device 210, and the second image may be an image acquired in a second direction of the electronic device 210. The first direction and the second direction may be 180 degrees.

According to various embodiments, in operation 503, the electronic device 210 may determine, under control of the processor 213, whether a reflective object is sensed in the acquired first image and the acquired second image. The reflective object is a subject which receives and reflects light, and an image of the reflective object may be captured when the image is acquired through the image sensor 212 of the camera module 211.

Referring to FIG. 7, in operation 503, the electronic device 200 may obtain reflectance $f_r(\omega_i,\omega_r)$ with reference to Equation 1 under control of the processor 213. In operation 503, under control of the processor 213, an optical characteristic of the reflective object on the image and the location (e.g. coordinates) of the reflective object on the image may be determined based on the reflectance $f_r(\omega_i,\omega_r)$.

In various embodiments, in operation 503, the electronic device 200 may be configured to perform an image synthesis operation, under control of the processor 213, when the obtained reflectance $f_r(\omega_i,\omega_r)$ is determined to be greater than a particular (or designated) reflectance.

In various embodiments, in operation 503, the electronic device 200 may be configured to end the image synthesis operation, under control of the processor 213, when the obtained reflectance $f_r(\omega_i,\omega_r)$ is determined to be smaller than the particular (or designated) reflectance. According to various embodiments, when a reflective object is not sensed in the acquired first image and the acquired second image in operation 503, the electronic device 210 may end the image synthesis operation, under control of the processor 213.

According to various embodiments, when a reflective object is sensed in the acquired first image and the acquired second image in operation 503, the electronic device 210 may proceed to operation 505, under control of the processor 213. The reflective object may be at least one object having a reflective attribute related to light reflection.

According to various embodiments, under control of the processor 213, the electronic device 210 may transmit the acquired first image and the acquired second image to the cloud platform 250 via a communication module (e.g. the communication module 190). The engine 257 of the cloud platform 250 may perform an image recognition operation to generate recognition information regarding the first image and/or the second image, and may transmit the recognition information to the electronic device 210. The recognition information regarding the first image and/or the second image may include information on a reflective attribute of the reflective object. In operation 503, under control of the processor 213, the electronic device 210 may determine whether a reflective object is sensed from an object included in the acquired first image and/or the acquired second image by using the recognition information transmitted from the cloud platform 250.

According to various embodiments, in operation 505, the electronic device 210 may obtain, under control of the processor 213, a reflective attribute of the reflective object included in each of the first image and the second image.

The reflective attribute of the reflective object, which is obtained under control of the processor 213 in operation 505, may be at least one of information on a geometric characteristic of the reflective object and information on an optical characteristic of the reflective object.

The information on the geometric characteristic of the reflective object may be at least one of pieces of information regarding, for example, the size of the reflective object in the acquired image, the shape of the reflective object, the curvature of the reflective object, and the location (e.g. coordinates) of a reflective object region in the image.

The information on the optical characteristic of the reflective object may be at least one of pieces of information regarding, for example, the color of the reflective object, the transparency of the reflective object, the refractive index of the reflective object, and the reflectance of the reflective object.

According to various embodiments, in operation 505, under control of the processor 213, the electronic device 210 may obtain, from the recognition information transmitted by the cloud platform 250, reflective attribute information of the reflective object included in the recognition information.

According to various embodiments, in operation 407, under control of the processor 213, the electronic device 210 may synthesize, based on a reflective attribute, at least a part of the first image with at least a part of the second image.

According to various embodiments, in operation 507, under control of the processor 213, the electronic device 210 may synthesize one image of the first image and the second image, in which a reflective object is not sensed, with the other image of the first image and the second image, in which a reflective object is sensed, according to the obtained reflective attribute of the reflective object.

According to various embodiments, synthesizing the image, in which a reflective object is not sensed, with the image, in which a reflective object is sensed, according to the obtained reflective attribute of the reflective object may be an operation in which: the processor 213 changes at least one of the size, curvature, and shape of the image, in which a reflective object is not sensed, by using information on the geometric characteristic of the reflective object; and the processor 213 changes at least one of the color, refractive index, and transparency of the image, in which the reflective object is not sensed, by using information on the optical characteristic of the reflective object.

For example, the synthesizing operation may be an operation of changing the image, in which a reflective object is not sensed, so as to coincide with the shape, the curvature, and size of the reflective object and changing the image, in which a reflective object is not sensed, so as to correspond to the color, transparency, and refractive index of the reflective object.

According to various embodiments, in operation 507, when the image in which a reflective object is not sensed is changed according to the obtained reflective attribute of the reflective object, the electronic device 200 may synthesize, under control of the processor 213, the changed image, in which a reflective object is not sensed, with the image in which a reflective object is sensed, according to information on the location (e.g. coordinates) of a reflective object region on the image such that the changed image corresponds to a reflective object region of the image in which a reflective object is sensed.

According to various embodiments, in operation 507, when the image in which a reflective object is not sensed is changed according to the obtained reflective attribute of the reflective object, the electronic device 200 may synthesize, under control of the processor 213, at least a part of the changed image, in which a reflective object is not sensed, with the image in which a reflective object is sensed, according to information on the location (e.g. coordinates) of a reflective object region on the image such that the at least part of the changed image corresponds to a reflective object region of the image in which a reflective object is sensed.

According to various embodiments, in operation 507, under control of the processor 213, the electronic device 200 may determine, based on the relative location of at least one reflective object and at least a part of the second image, at least one of a location or a shape in which the at least part of a second image is to be synthesized with at least a part of a region corresponding to the at least one reflective object.

When FIG. 5 is described with reference to FIG. 10A, the electronic device 200 may identify, under control of the processor 213, a reflective object 1011 included in a first image 1010, and may synthesize at least a part of the second image with the region of the reflective object 1011 according to a reflective attribute of the reflective object to generate a changed image 1012.

Figure 6:
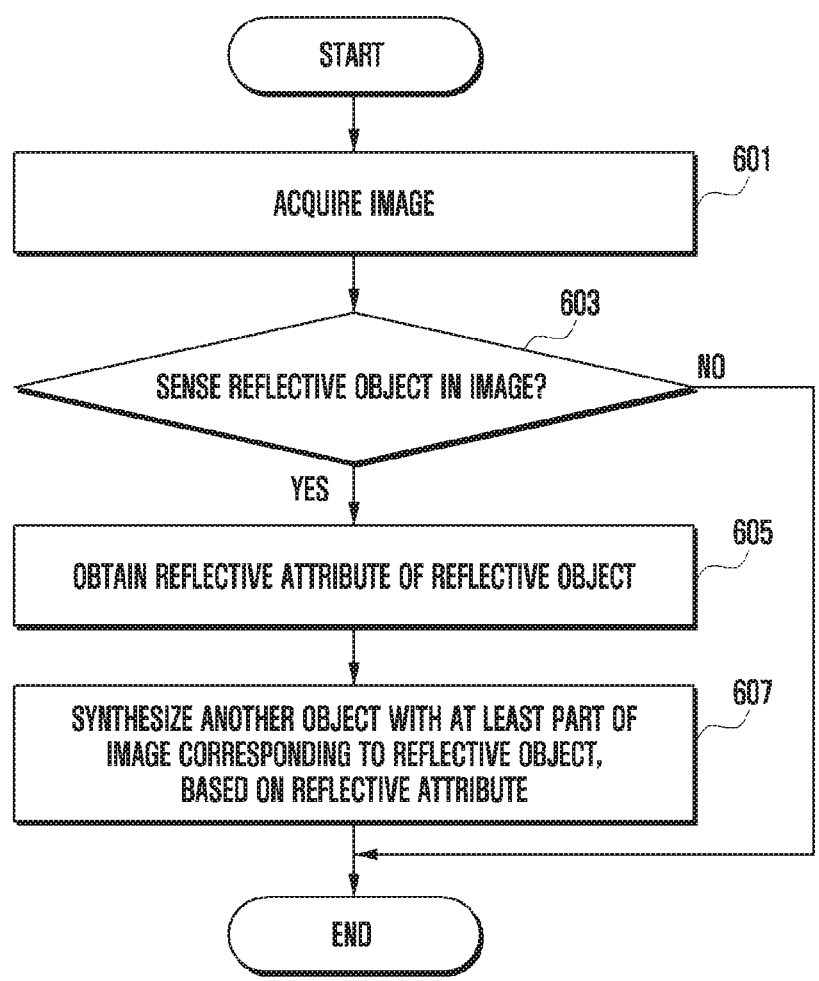
FIG. 6 is a flowchart illustrating an image synthesizing method according to various embodiments of the disclosure.

FIG. 6 is a flowchart illustrating an image synthesizing method according to various embodiments of the disclosure.

According to various embodiments, in operation 601, under control of the processor 213, the electronic device 210 may acquire an image through the image sensor 212 of the camera module 211.

According to various embodiments, in operation 601, when a user input for image acquisition is received, the electronic device 210 may acquire, under control of the processor 213, the image through the image sensor 212 of the camera module 211.

According to various embodiments, the image may be an image pre-stored in the cloud platform 250, and the electronic device 210 may receive the image from the image storage 254 of the cloud platform 250 via a communication module (e.g. reference numeral 190 in FIG. 1).

According to various embodiments, in operation 603, the electronic device 210 may determine, under control of the processor 213, whether a reflective object is sensed from an object included in the acquired image. The reflective object is a subject which receives and reflects light, and an image of the reflective object may be captured when the image is acquired through the image sensor 212 of the camera module 211.

According to various embodiments, under control of the processor 213, the electronic device 210 may transmit the acquired image to the cloud platform 250 via a communication module (e.g. the communication module 190). The engine 257 of the cloud platform 250 may perform an image recognition operation to generate recognition information regarding the image, and may transmit the recognition information to the electronic device 210. The recognition information regarding the image may include information on a reflective attribute of the reflective object. In operation 603, under control of the processor 213, the electronic device 210 may determine whether a reflective object is sensed from an object included in the acquired image by using the recognition information transmitted from the cloud platform 250.

Referring to FIG. 7, in operation 603, the electronic device 200 may obtain reflectance $f_r(\omega_i,\omega_r)$ with reference to Equation 1 under control of the processor 213. In operation 603, under control of the processor 213, an optical characteristic of the reflective object on the image and the location (e.g. coordinates) of the reflective object on the image may be determined based on the reflectance $f_r(\omega_i,\omega_r)$.

In various embodiments, in operation 603, the electronic device 200 may be configured to perform an image synthesis operation, under control of the processor 213, when the obtained reflectance $f_r(\omega_i,\omega_r)$ is determined to be greater than a particular (or designated) reflectance.

In various embodiments, in operation 603, the electronic device 200 may be configured to end the image synthesis operation, under control of the processor 213, when the obtained reflectance $f_r(\omega_i,\omega_r)$ is determined to be smaller than the particular (or designated) reflectance.

According to various embodiments, when a reflective object is not sensed in the acquired image in operation 603, the electronic device 210 may end the image synthesis operation, under control of the processor 213.

According to various embodiments, when a reflective object is sensed in the acquired image in operation 603, the electronic device 210 may proceed to operation 605, under control of the processor 213. The reflective object may be at least one object having a reflective attribute related to light reflection.

According to various embodiments, in operation 605, the electronic device 210 may obtain, under control of the processor 213, a reflective attribute of the reflective object included in the image.

The reflective attribute of the reflective object, which is obtained under control of the processor 213 in operation 605, may be at least one of information on a geometric characteristic of the reflective object and information on an optical characteristic of the reflective object.

The information on the geometric characteristic of the reflective object may be at least one of pieces of information regarding, for example, the size of the reflective object in the acquired image, the shape of the reflective object, the curvature of the reflective object, and the location (e.g. coordinates) of a reflective object region in the image.

The information on the optical characteristic of the reflective object may be at least one of pieces of information regarding, for example, the color of the reflective object, the transparency of the reflective object, the refractive index of the reflective object, and the reflectance of the reflective object.

According to various embodiments, in operation 605, under control of the processor 213, the electronic device 210 may obtain, from the recognition information transmitted by the cloud platform 250, reflective attribute information of the reflective object included in the recognition information.

According to various embodiments, when the cloud platform 250 receives an image from the electronic device 210, the engine 257 of the cloud platform 250 may perform an image recognition operation to generate recognition information regarding the image. The cloud platform 250 may identify an object included in the image by using the recognition information of the image. The object included in the image may include a reflective object. For example, a partner or a family member of a main user (e.g. a user) of the electronic device 210 may be recognized as an object in the image. The cloud platform 250 may determine a correlation between objects included in images by using recognition information of each of the objects of the images.

According to various embodiments, in operation 607, under control of the processor 213, the electronic device 210 may synthesize, based on a reflective attribute, at least a part of the image, corresponding to the reflective object, with at least a part of an object, other than the reflective object, included in the image.

According to various embodiments, in operation 607, under control of the processor 213, the electronic device 210 may synthesize one or more objects with each other according to the obtained reflective attribute of the reflective object.

According to various embodiments, synthesizing one or more objects with each other in the image according to the obtained reflective attribute of the reflective object may be an operation in which: the processor 213 changes at least one of the size, curvature, and shape of the object, other than the reflective object, included in the image by using information on the geometric characteristic of the reflective object; and the processor 213 changes at least one of the color, refractive index, and transparency of the object, other than the reflective object, included in the image by using information on the optical characteristic of the reflective object.

For example, the synthesizing operation may be an operation of changing the object, other than the reflective object, included in the image so as to coincide with the shape, the curvature, and size of the reflective object and changing the object, other than the reflective object, included in the image so as to correspond to the color, transparency, and refractive index of the reflective object.

According to various embodiments, in operation 607, when the object, other than the reflective object, included in the image is changed according to the obtained reflective attribute of the reflective object, the electronic device 200 may synthesize, under control of the processor 213, the object, other than the reflective object, included in the changed image with the image according to information on the location (e.g. coordinates) of a reflective object region on the image such that the changed image corresponds to a reflective object region of the image.

According to various embodiments, in operation 607, under control of the processor 213, the electronic device 200 may determine, based on the relative location of at least one reflective object and at least a part of the image, at least one of a location or a shape in which the at least a part of the image is to be synthesized with at least a part of a region corresponding to the at least one reflective object.

When FIG. 6 is described with reference to FIG. 10B, the electronic device 210 may generate a first changed image 1041 by synthesizing at least a part of a second object 1023 with a first reflective object region 1031 of a first object 1021 under control of the processor 213. The changed first image 1041 is an image obtained by changing at least part of the second object 1023 according to a reflective attribute and synthesizing the changed part with the first reflective region 1031 of the first object 1021.

The electronic device 210 may generate a second changed image 1043 by synthesizing at least a part of the first object 1021 with a second reflective object region 1033 of the second object 1023 under control of the processor 213. The changed second image 1043 is an image obtained by changing at least part of the first object 1021 according to a reflective attribute and synthesizing the changed part with the second reflective region 1033 of the second object 1023.

FIG. 7 illustrates a reflective object detection method according to various embodiments of the disclosure.

The reflective object detection method may be a method using a bidirectional reflectance distribution function (BRDF).

A reflective object 710 may reflect light, incident from a light source 711, to the electronic device 210. If the incident angle of light incident onto the reflective object 710 is $\omega_i$ and the reflective angle thereof is $\omega_r$, reflectance $f_r(\omega_i, \omega_r)$ may be the same as that in Equation 1.

When the reflectance obtained by Equation 1 in the reflective object is equal to or greater than a particular reflectance, the electronic device 210 may determine the reflective object as a detected reflective object.

According to various embodiments, as an embodiment of sensing a reflective object through deep learning, the electronic device 210 may be configured to learn labelable data, such as a reflective object (an eye, sunglasses, or a mirror) and determine a reflective object region when an input image comes in.

In various embodiments, when the electronic device 210 transmits a raw image to the cloud platform 250, the cloud platform 250 may sense a reflective object by using the engine 255 and may transmit information according to a sensing result (e.g. at least one of information on a geometric characteristic of the reflective object and information on an optical characteristic of the reflective object) to the electronic device 210, and the electronic device 210 may synthesize the image according to the information according to the sensing result. To this end, the engine 255 of the cloud platform 250 may recognize the reflective object through a deep learning method or a bidirectional reflectance distribution function (BRDF).

Figure 8:
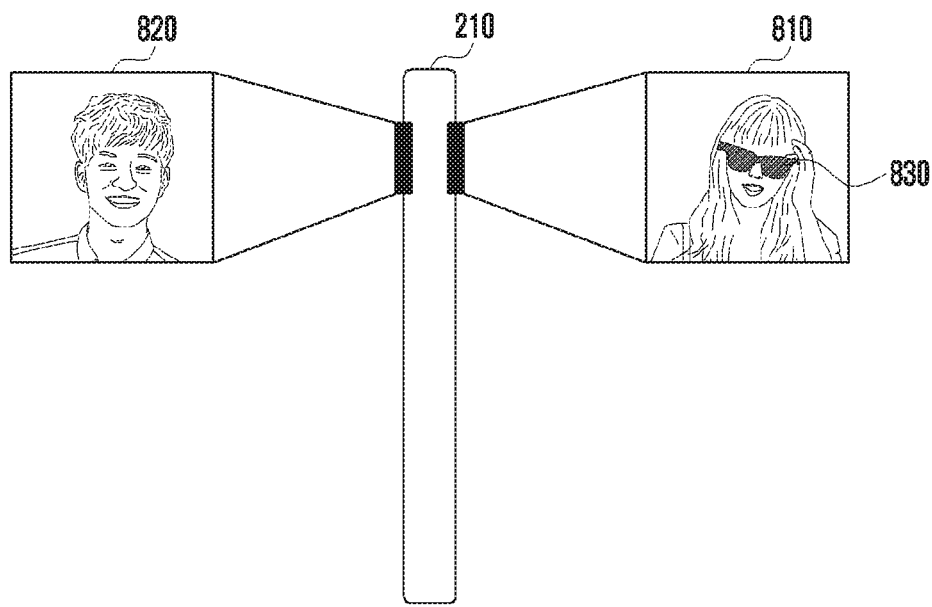
FIG. 8 illustrates an image acquisition method according to various embodiments of the disclosure.
Figure 9:
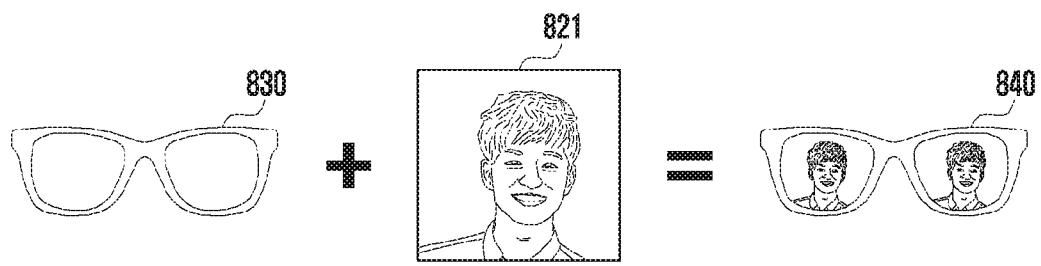
FIG. 9 illustrates an image synthesizing method according to various embodiments of the disclosure.

FIG. 8 illustrates an image acquisition method according to various embodiments of the disclosure. FIG. 9 illustrates an image synthesizing method according to various embodiments of the disclosure.

In FIGS. 8 and 9, a first image 810 may be an image acquired by a rear camera disposed on a second surface of the electronic device 210, and the second image 820 may be an image acquired by a front camera disposed on a first surface of the electronic device 210. The first image 810 may include a reflective object region 830. In FIG. 8, the reflective object region may be sunglasses, for example.

The electronic device 210 may obtain at least one of pieces of reflective attribute information of a reflective object (e.g. information on a geometric characteristic and information on an optical characteristic of a reflective object) in the reflective object region 830.

The electronic device 210 may generate an image 821 by changing the second image 820, based on the obtained reflective attribute information, and may synthesize the changed image 821 with the reflective objective region 830 to generate a synthesized image 840.

Figure 10A:
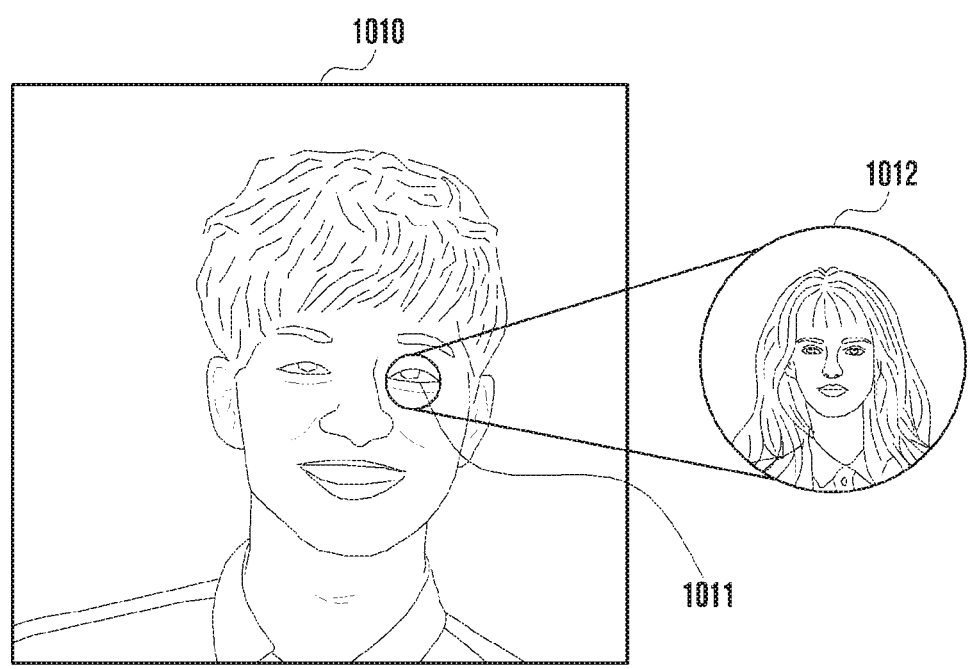
FIGS. 10A and 10B and FIG. 11 illustrate examples of magnifying a synthesized image according to various embodiments of the disclosure.
Figure 10B:
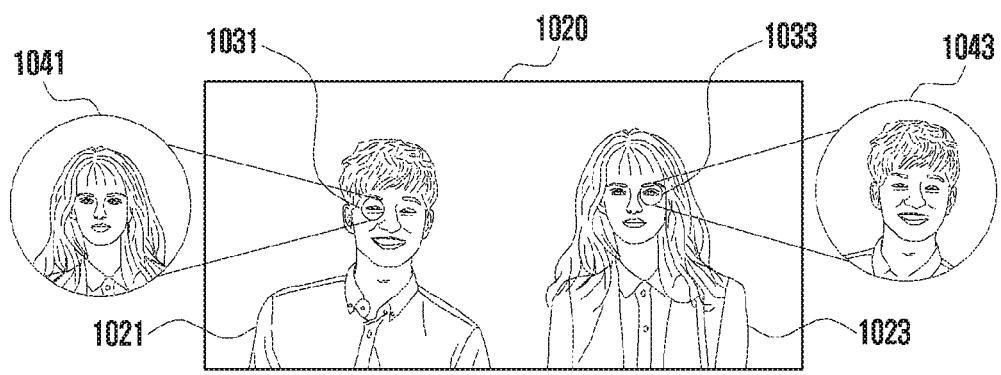
Figure 11:
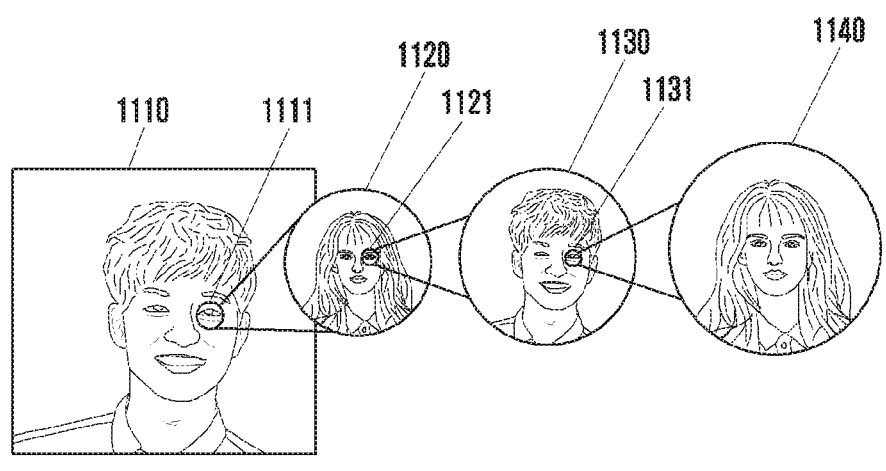

FIGS. 10A and 10B and FIG. 11 illustrate examples of magnifying a synthesized image according to various embodiments of the disclosure.

FIG. 10A relates to an example of image synthesis using different images. In reference numeral 1001, when a user selects a reflective object region 1011 (e.g. an eye) of a synthesized image 1010, the user may see a changed image 1012 corresponding to reflective attribute information of the reflective object region 1011.

Under control of the processor 213, the electronic device 200 may identify the reflective object 1011 included in a first image 1010, and may generate the changed image 1012 by synthesizing at least a part of a second image with the reflective object region 1011 according to the reflective attribute of the reflective object.

FIG. 10B relates to image synthesis using different objects included in one image. In reference numeral 1003, when a user selects reflective object regions 1031 and 1033 (e.g. eyes) in objects 1021 and 1023 of a synthesized image 1020, the user may see changed images 1041 and 1043 corresponding to reflective attribute information of the reflective object regions 1031 and 1033, respectively.

For example, the first object 1021 may be a first person (e.g. a man), and the second object 1023 may be a second person (e.g. a woman). The first object 1021 and the second object 1023 may be included in one image 1020. The first object 1021 may include the first reflective object region 1031, and the second object 1023 may include the second reflective object region 1033. The image 1020 may include at least one reflective object 1031 or 1033.

The electronic device 210 may generate the first changed image 1041 by synthesizing at least a part of the second object 1023 with the first reflective object region 1031 of the first object 1021 under control of the processor 213. The first changed image 1041 may be an image obtained by changing at least a part of the second object 1023 according to a reflective attribute and synthesizing the changed part with the first reflective object region 1031 of the first object 1021.

The electronic device 210 may generate the second changed image 1043 by synthesizing at least a part of the first object 1021 with the second reflective object region 1033 of the second object 1023 under control of the processor 213. The second changed image 1043 may be an image obtained by changing at least a part of the first object 1021 according to a reflective attribute and synthesizing the changed part with the second reflective object region 1033 of the second object 1023

In reference numeral 1101, reflective object regions 1111, 1121, and 1131 of multiple images 1110, 1120, and 1130 may be synthesized according to the method disclosed in FIG. 6. In this case, if two images 1110 and 1120 are synthesized with respect to the respective reflective object regions 1111 and 1121, this may exhibit an infinite zoom effect.

FIG. 12 is a perspective view of the front of a mobile electronic device according to one embodiment. FIG. 13 is a perspective view of the rear of the mobile electronic device of FIG. 12.

Referring to FIGS. 12 and 13, an electronic device 1200 according to one embodiment may include a housing 1210 including: a first surface (or a front surface) 1210A; a second surface (or a rear surface) 1210B; and a side surface 1210C surrounding the space between the first surface 1210A and the second surface 1210B. In another embodiment (not shown), the housing may refer to a structure forming some of the first surface 1210A, the second surface 1210B, and the side surface 1210C in FIG. 1. According to one embodiment, the first surface 1210A may be formed of a front plate 1202 (e.g. a glass plate including various coating layers, or a polymer plate), at least a part of which is substantially transparent. The second surface 1210B may be formed of a substantially opaque rear plate 1211. The rear plate 1211 may be formed of, for example, coated or colored glass, ceramic, polymer, metal (e.g. aluminum, stainless steel (STS), or magnesium), or a combination of at least two of the above-described materials. The side surface 1210C is coupled to the front plate 1202 and the rear plate 1211, may be formed of a side bezel structure (or "a side member") 118 which includes metal and/or polymer. In an embodiment, the rear plate 1211 and the side bezel structure 118 may be integrally formed and may contain the same material (e.g. a metal material such as aluminum).

According to one embodiment, the electronic device 1200 may include at least one among: a display 1201; audio modules 1203, 1207, and 1214; sensor modules 1204 and 1219; camera modules 1205, 1212, and 1213; key input devices 1215, 1216, and 1217; an indicator 1206; and connector holes 1208 and 1209. In an embodiment, in the electronic device 1200, at least one (e.g. the key input devices 1215, 1216, and 1217, or the indicator 1206) of the elements may be omitted or another element may be additionally included.

The display 1201 may be exposed through, for example, the considerable portion of front plate 1202. The display 1201 may be combined with or disposed adjacent to a touch sensing circuit, a pressure sensor capable of measuring the strength (pressure) of touch, and/or a digitizer configured to detect a stylus pen using a magnetic field.

The audio modules 1203, 1207, and 1214 may include a microphone hole 1203 and speaker holes 1207 and 1214. A microphone for acquiring external sound may be disposed in the microphone hole 1203, and, in an embodiment, multiple microphones may be disposed so as to sense the direction of sound. The speaker holes 1207 and 1214 may include an outer speaker hole 1207 and a calling receiver hole 1214. In an embodiment, the speaker holes 1207 and 1214 and the microphone hole 103 may be implemented as one hole, or a speaker (e.g. a Piezo speaker) may be included without the speaker holes 1207 and 1214.

The sensor modules 1204 and 1219 may generate an electrical signal or a data value, which corresponds to an operation state inside the electronic device 1200 or an environment state outside the electronic device 1200. The sensor modules 1204 and 1219 may include, for example, a first sensor module 1204 (e.g. a proximity sensor) and/or a second sensor module (not shown) (e.g. a fingerprint sensor), disposed on the first surface (plate) 1210A of the housing 1210, and/or a third sensor module 1219 (e.g. an HRM sensor), which is disposed on the second surface 1210B of the housing 1210. The fingerprint sensor may be disposed not only on the first surface 1210A (e.g. a home key button 115) of the housing 1210 but also on the second surface 1210B thereof. The electronic device 1200 may further include at least one of an illumination sensor 1204 or an unillustrated sensor module, for example, a gesture sensor, a gyro sensor, an air pressure sensor, a magnetic sensor, an acceleration sensor, a grip sensor, a color sensor, an infrared (IR) sensor, a biometric sensor, a temperature sensor, or a humidity sensor.

The camera modules 1205, 1212, and 1213 may include: a first camera device 1205 disposed on the first surface 1210A of the electronic device 1200; and a second camera device 1212 and/or a flash 1213, disposed on the second surface 1210B. Each of the camera modules 1205 and 1212 may include one or multiple lenses, an image sensor, and/or an image signal processor. The flash 1213 may include, for example, a light-emitting diode or a xenon lamp. In an embodiment, two or more lenses (wide-angle and telephoto lenses) and image sensors may be disposed on one surface of the electronic device 1200.

The key input devices 1215, 1216, and 1217 may include: a home key button 1215 disposed on the first surface 1210A of the housing 1210; a touch pad 1216 disposed near the home key button 1215; and/or a side key button 1217 disposed on the side surface 1210C of the housing 1210. In another embodiment, the electronic device 1200 may not include some or all of the key input devices 1215, 1216, and 1217, and the key input device 1215, 1216, or 1217, which is not included in the electronic device 1200, may be implemented as another type of element, such as a soft key, on the display 1201.

The indicator 1206 may be disposed, for example, on the first surface 1210A of the housing 1210. The indicator 1206, for example, may provide state information of the electronic device 1200 in the form of light, and may include an LED. The connector holes 1208 and 1209 may include: a first connector hole 1208 capable of receiving a connector (e.g. a USB connector) for transmitting or receiving power and/or data to or from an external electronic device; and/or a second connector hole (e.g. an earphone jack) 1209 capable of receiving a connector for transmitting or receiving an audio signal to or from an external electronic device.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The invention claimed is:

1. An electronic device comprising:
   a first camera configured to acquire a first image in a designated direction;
   a second camera configured to acquire a second image in a direction different from the designated direction;
   a memory; and
   a processor, wherein the processor is configured to:
   acquire the first image by using the first camera and the second image by using the second camera;
   identify at least one reflective object, having a reflectance greater than a designated reflectance with respect to light, in the first image;
   acquire reflective attribute information including information on an optical characteristic of the at least one reflective object in the first image; and
   synthesize with the first image by changing at least a part of the second image to correspond to the information on the optical characteristic of the at least one reflective object in the first image.

2. The electronic device of claim 1, further comprising a communication module,
   wherein the processor is further configured to:
   transmit the first image to an external device via the communication module, as a part of the identifying of the at least one reflective object;
   receive, from the external device, recognition information generated based on image recognition of the first image; and
   determine the at least one reflective object, based on the recognition information.

3. The electronic device of claim 2, wherein the processor is further configured to receive, from the external device, reflective attribute information of an object recognized in the first image as at least a part of the recognition information.

4. The electronic device of claim 1, wherein the processor is further configured to:
   acquire reflective attribute information including information on a geometric characteristic of the at least one reflective object in the first image; and
   synthesize with the first image by changing at least a part of the second image to correspond to the information on the geometric characteristic of the at least one reflective object in the first image.

5. The electronic device of claim 4, wherein the information on the geometric characteristic of the at least one reflective object in the first image includes at least one of a size of the reflective object, a shape of the reflective object, a curvature of the reflective object, and information about a location of the reflective object on the first image.

6. The electronic device of claim 4, wherein information on the optical characteristic of the at least one reflective object includes at least one of a color of the reflective object, a transparency of the reflective object, a refractive index of the reflective object, and a reflectance of the reflective object.

7. The electronic device of claim 1, wherein the second image is selected according to a degree of association with the first image.

8. The electronic device of claim 1, wherein the processor is further configured to, as a part of the synthesis, determine at least one of a location or a shape in which the at least part of the second image is to be synthesized with the at least part of the region corresponding to the at least one reflective object, based on a relative location of the at least one reflective object and the at least part of the second image.

9. An image capturing method of an electronic device comprising a first camera configured to acquire a first image in a designated direction and a second camera configured to acquire a second image in a direction different from the designated direction, the method comprising:
acquiring the first image by using the camera and the second image by using the second camera;
identifying at least one reflective object, having a reflectance greater than a designated reflectance with respect to light, in the first image;
acquiring reflective attribute information including information on an optical characteristic of the at least one reflective object in the first image; and
synthesizing with the first image by changing at least a part of the second image to correspond to the information on the optical characteristic of the at least one reflective object in the first image.

10. The method of claim 9, further comprising:
transmitting the first image to an external device via a communication module, as a part of the identifying of the at least one reflective object;
receiving, from the external device, recognition information generated based on image recognition of the first image; and
determining the at least one reflective object, based on the recognition information.

11. The method of claim 10, further comprising receiving, from the external device, reflective attribute information of an object recognized in the first image as at least a part of the recognition information.

12. The method of claim 9, further comprising
acquiring reflective attribute information including information on a geometric characteristic of the at least one reflective object in the first image; and
synthesizing with the first image by changing at least a part of the second image to correspond to the information on the geometric characteristic of the at least one reflective object in the first image.

13. The method of claim 12, wherein the information on the geometric characteristic of the at least one reflective object in the first image includes at least one of a size of the reflective object, a shape of the reflective object, a curvature of the reflective object, and information about a location of the reflective object on the first image.

14. The method of claim 12, wherein information on the optical characteristic of the at least one reflective object includes at least one of a color of the reflective object, a transparency of the reflective object, a refractive index of the reflective object, and a reflectance of the reflective object.

15. The method of claim 9, wherein the second image is selected according to a degree of association with the first image.

* * * * *